United States Patent
Steele et al.

(10) Patent No.: US 8,357,310 B2
(45) Date of Patent: Jan. 22, 2013

(54) AQUEOUS BASED COOLING OF COMPONENTS HAVING HIGH SURFACE AREA LEVELS OF ALUMINUM OR NICKEL

(75) Inventors: John W. Steele, New Hartford, CT (US); Durwood M. Beringer, Suffield, CT (US); Mark R. Jaworowski, Glastonbury, CT (US); Jerome D. Varsik, Barkhamsted, CT (US); Jesse Morenz, Hartford, CT (US); Brian Tull, West New York, NJ (US)

(73) Assignee: Hamilton Sundstrand Space Systems International, Inc., Windsor Locks, CT (US)

( * ) Notice: Subject to any disclaimer, the term of this patent is extended or adjusted under 35 U.S.C. 154(b) by 275 days.

(21) Appl. No.: 12/943,533

(22) Filed: Nov. 10, 2010

(65) Prior Publication Data

US 2012/0111536 A1    May 10, 2012

(51) Int. Cl.
*C09K 5/00* (2006.01)
*C09K 3/18* (2006.01)

(52) U.S. Cl. ............... 252/79; 252/70; 252/71; 252/73; 252/75; 252/76; 252/77; 252/78.1

(58) Field of Classification Search ............ 252/70, 252/71, 73, 75, 76, 77, 78.1, 79
See application file for complete search history.

(56) References Cited

U.S. PATENT DOCUMENTS

| | | | | |
|---|---|---|---|---|
| 4,448,702 A | * | 5/1984 | Kaes | 252/70 |
| 4,587,028 A | * | 5/1986 | Darden | 252/76 |
| 4,647,392 A | * | 3/1987 | Darden et al. | 252/75 |
| 4,946,616 A | * | 8/1990 | Falla et al. | 252/75 |
| 5,741,436 A | * | 4/1998 | Gershun et al. | 252/76 |
| 5,811,025 A | | 9/1998 | Kawai et al. | |
| 5,997,763 A | | 12/1999 | Pabon, Jr. et al. | |
| 6,676,847 B2 | | 1/2004 | Turcotte et al. | |
| 6,676,848 B2 | | 1/2004 | Maes et al. | |
| 6,802,988 B1 | * | 10/2004 | Wenderoth et al. | 252/73 |
| 7,704,406 B2 | | 4/2010 | Wenderoth et al. | |
| 7,744,775 B2 | | 6/2010 | Yang et al. | |
| 2004/0029754 A1 | * | 2/2004 | Wenderoth et al. | 510/185 |
| 2004/0075077 A1 | * | 4/2004 | Maes | 252/71 |
| 2004/0227124 A1 | * | 11/2004 | Turcotte et al. | 252/71 |
| 2005/0051754 A1 | * | 3/2005 | Maes et al. | 252/67 |
| 2005/0218370 A1 | * | 10/2005 | Egawa et al. | 252/70 |
| 2006/0038159 A1 | * | 2/2006 | Fukutani et al. | 252/75 |
| 2007/0158612 A1 | * | 7/2007 | Maes et al. | 252/71 |
| 2009/0001313 A1 | * | 1/2009 | Lievens et al. | 252/75 |
| 2009/0151598 A1 | * | 6/2009 | Reinhard et al. | 106/14.42 |
| 2009/0294102 A1 | * | 12/2009 | Yang et al. | 165/104.19 |
| 2010/0006796 A1 | * | 1/2010 | Yang et al. | 252/67 |
| 2010/0116473 A1 | * | 5/2010 | Yang et al. | 165/134.1 |
| 2011/0006250 A1 | * | 1/2011 | Lievens et al. | 252/75 |

* cited by examiner

*Primary Examiner* — Peter F Godenschwager
*Assistant Examiner* — Jane L Stanley
(74) *Attorney, Agent, or Firm* — Kinney & Lange, P.A.

(57) ABSTRACT

An aqueous-based coolant for cooling and reducing corrosion potential in applications having high aluminum or nickel surface area to coolant volume ratios has a pH between 8 and 9 and includes about 35 weight % to about 65 weight % propylene glycol, about 1.0 weight % to about 4.0 weight % 2-ethylhexanoic acid, about 0.25 weight % to about 1.0 weight % sebacic acid, about 0.25 weight % to about 1.0 weight % benzoic acid and about 0.03 weight % to about 0.1 weight % molybdate oxyanion. A cooling system includes an aluminum or nickel surface and the aqueous-based coolant. A method of cooling a component surface containing aluminum or nickel includes delivering the aqueous-based coolant to the component surface and cooling the component surface with the aqueous-based coolant.

20 Claims, 2 Drawing Sheets

AQUEOUS BASED COOLING OF COMPONENTS HAVING HIGH SURFACE AREA LEVELS OF ALUMINUM OR NICKEL

BACKGROUND

Aluminum is a desirable metal for use in a variety of aerospace components. Aluminum has a low density while possessing a high strength-to-weight ratio. Aluminum is also durable and malleable, the latter characteristic allowing its use in a variety of shaped components. Due to these properties, aluminum and its alloys are vital to aerospace components. Nickel is also a desirable metal for aerospace components due to its innate corrosion resistance, thermal conductivity and plating ability. In particular, aluminum and nickel are desirable metals for aerospace cooling system components. These components include cold plates, heat exchangers, coolant transfer lines as well as other components in cooling systems.

Aqueous-based coolants are desirable for use in aerospace cooling systems due to their high thermal performance, low viscosities and typically low costs. When combined with components having high aluminum surface areas, however, aqueous-based coolants present significant material compatibility challenges. Namely, current commercially-available aqueous-based coolants corrode aluminum wetted surfaces. These challenges are particularly concerning for flow-restrictive components where aluminum corrosion products can restrict or block coolant flow. While some commercially-available aqueous-based coolants perform better than others, they are not designed to be compatible with components having surface areas containing a high percentage of aluminum. The non-aerospace applications such as automobile radiators for which current coolants were designed do not contain the high levels of aluminum used in many aerospace cooling system components. As a result, current coolants do not provide adequate corrosion resistance for high aluminum surface area applications. Additionally, non-aerospace components typically contain other metals such as copper and carbon steel. Coolants selected for use with components containing copper and carbon steel normally contain additional corrosion inhibitors particularly suited to those metals. Unfortunately, these additional corrosion inhibitors can cause fouling in aerospace applications and accelerate aluminum corrosion. The problems described above also affect components containing nickel. Therefore, a need exists for providing aqueous-based coolants that adequately inhibit corrosion for aerospace components that contain high amounts of aluminum and nickel surface areas.

SUMMARY

A cooling system includes an aluminum or nickel surface and an aqueous-based coolant. The aqueous-based coolant has a pH between 8 and 9 and includes about 35 weight % to about 65 weight % propylene glycol, about 1.0 weight % to about 4.0 weight % 2-ethylhexanoic acid, about 0.25 weight % to about 1.0 weight % sebacic acid, about 0.25 weight % to about 1.0 weight % benzoic acid and about 0.03 weight % to about 0.1 weight % molybdate oxyanion.

A method of cooling a component surface containing aluminum or nickel includes delivering an aqueous-based coolant to the component surface and cooling the component surface with the aqueous-based coolant. The delivered aqueous-based coolant has a pH between 8 and 9 and includes about 35 weight % to about 65 weight % propylene glycol, about 1.0 weight % to about 4.0 weight % 2-ethylhexanoic acid, about 0.5 weight % to about 1.0 weight % sebacic acid, about 0.5 weight % to about 1.0 weight % benzoic acid and about 0.03 weight % to about 0.1 weight % molybdate oxyanion.

An aqueous-based coolant includes about 1.0 weight % to about 4.0 weight % 2-ethylhexanoic acid, about 0.25 weight % to about 1.0 weight % sebacic acid, about 0.25 weight % to about 1.0 weight % benzoic acid and about 0.03 weight % to about 0.1 weight % molybdate oxyanion. The aqueous-based coolant contains 2-ethylhexanoic acid, sebacic acid and benzoic acid at a ratio of about 4:1:1.

DETAILED DESCRIPTION

Figure 1:
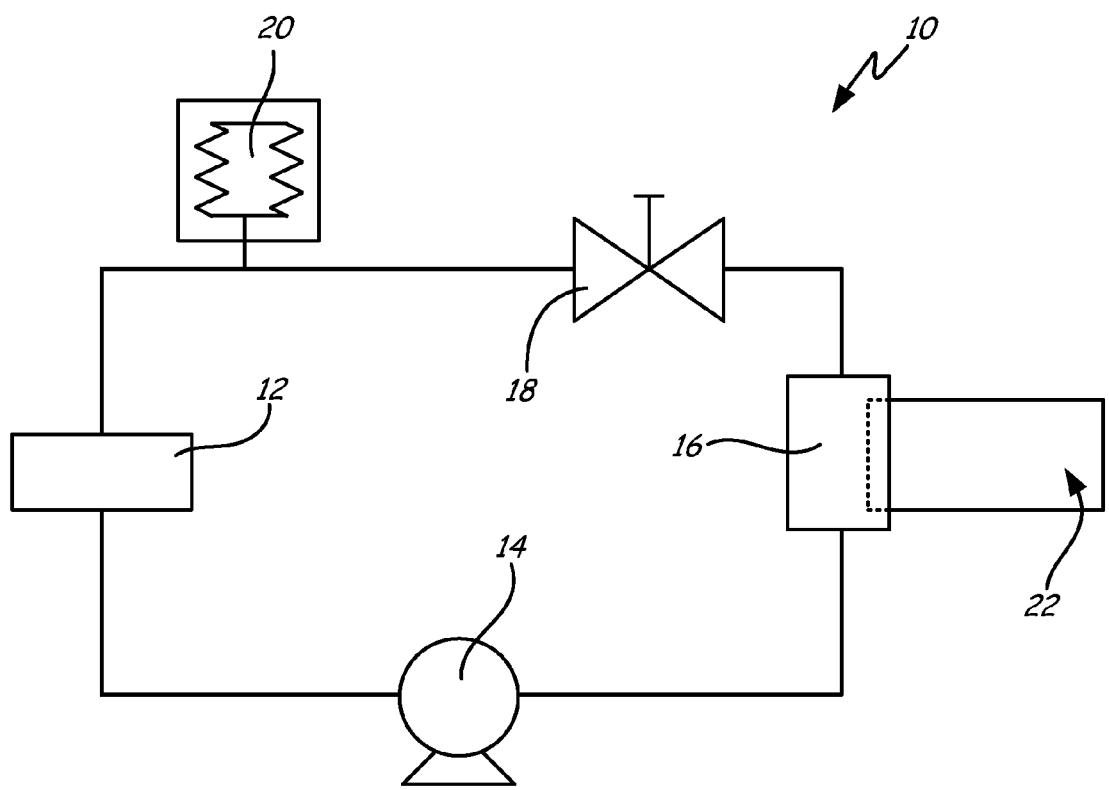
FIG. 1 is a schematic view of a heat exchanger employing a cooling system.

The present invention provides a cooling system, a method of cooling an aluminum or nickel surface and an aqueous-based coolant all of which enable aqueous-based cooling of components having high aluminum or nickel surface areas. The aqueous-based coolant used in the system and method generally includes propylene glycol, 2-ethylhexanoic acid, sebacic acid, benzoic acid and molybdate oxyanion.

"Aluminum" refers to pure aluminum as well as aluminum alloys (e.g., alloys in which aluminum is the predominant metal). "Nickel" refers to pure nickel as well as nickel alloys (e.g., alloys in which nickel is the predominant metal). While this disclosure specifically refers to corrosion inhibition for aluminum surfaces, the same concepts apply to nickel surfaces. Depending on the temperature and specific function of a component or system that requires cooling, the component or system may contain surfaces with large amounts of both aluminum and nickel. Many aerospace components contain higher levels of aluminum than comparable terrestrial components. The benefits of aluminum (high strength-to-weight ratio, durability, malleability) allow for size reduction for many aerospace components. For example, aluminum microchannel heat exchangers can be used in place of larger conventional heat exchangers. Microchannel heat exchangers occupy a smaller volume and offer improved heat transfer efficiency when compared to conventional heat exchangers. The smaller volume of the heat exchanger and the lower density of aluminum also contribute to reduce the overall weight of the system, generally considered a critical design parameter for aircraft and spacecraft. The smaller volumes are often accompanied by smaller clearances between component surfaces and smaller gaps in coolant flow paths. In some nickel heat exchangers, gaps between fins are only about 0.5 mm (0.020 inches) while comparable gaps in aluminum cold plates can be as low as about 0.6 mm (0.025 inches). Flow control valves can have gaps as small as about 0.3 mm (0.012 inches), and pumps can have clearances between the bushing and shaft between about 0.025 mm (0.001 inches) and about 0.04 mm (0.0015 inches). These reduced clearances and gaps are more sensitive to coolant precipitates and aluminum corrosion products. Precipitates within the aqueous-based coolant and dislodged corrosion products can block these small gaps to impede, restrict or block coolant flow. The aqueous-based coolant used in the present invention must not only provide sufficient corrosion resistance for aluminum surface, but also minimize the risk of precipitation within the coolant itself.

Spacecraft cooling systems in particular contain components having high aluminum surface areas. Cooling system components include cold plates, heat exchangers and fluid transfer lines. Heat exchangers include fins, cooling channels and refrigerant manifolds. Each of these components can be made of aluminum or contain aluminum. Additionally, cooling systems can contain other components having aluminum surfaces that come into contact with coolant streams.

These cooling systems and other aerospace components contain surfaces having large amounts of aluminum. The amount of aluminum surface area in aerospace applications can be much greater than in comparable terrestrial applications. Aerospace cooling systems may contain ten times as much aluminum surface area than cooling systems used in automotive or geothermal applications. This increased surface area leads to greater ratios of aluminum surface area to coolant volume. For example, in one particular aerospace application, the aluminum surface area to coolant volume ratio is about 4.7 cm$^2$ aluminum surface area per mL of coolant (12 square inches per cubic inch) in a flowing system and 34.6 cm$^2$/mL (88 square inches per cubic inch) in a static condition. Compare this with the most demanding terrestrial applications (coolant systems for solar power and geothermal applications), which are estimated to have aluminum surface area to coolant volume ratios of about 0.04 cm$^2$/mL (0.1 square inches per cubic inch) in a flowing system and 0.39 cm$^2$/mL (0.99 square inches per cubic inch) in a static condition. The aluminum surface area to coolant volume ratios for automotive applications are estimated to be an order of magnitude less than that of the solar power and geothermal applications. The vast difference in surface area to coolant volume explains why conventional, commercially-available aqueous-based coolants are not optimal choices for use in aerospace applications containing high levels of aluminum surface areas and why more specialized aqueous-based coolants are required. While the aqueous-based coolant described herein can also be used in terrestrial applications having low aluminum surface area to coolant ratios, it is particularly suitable for applications having an aluminum surface area to coolant volume ratio greater than or equal to about 1.0 cm$^2$ aluminum surface area per mL of coolant.

Aqueous-based coolants possess many attractive characteristics. First, water has a high heat capacity, making it an ideal coolant for heat-transfer applications. Second, water is typically easier to procure and produce when compared to other liquid coolants. Water is also non-toxic and generally easily disposed and deionized water has a relatively low electrical conductivity. Aqueous-based coolants typically contain a freezing point depressant to allow the coolant to withstand temperatures below 0° C. and one or more additives to reduce the corrosion potential water presents. The aqueous-based coolant used in the present invention typically includes between about 35 weight percent and about 65 weight percent water.

Propylene glycol is one example of a freezing point depressant. Propylene glycol is a diol with the molecular formula $C_3H_8O_2$ or $HO-CH_2-CHOH-CH_3$. Propylene glycol is a clear viscous liquid that is hygroscopic, miscible with water and thermally stable. Like ethylene glycol, propylene glycol acts as a freezing point depressant as the freezing point of propylene glycol is depressed when mixed with water due to the disruption of hydrogen bonding. Unlike ethylene glycol, propylene glycol has a generally low toxicity making it better suited for certain applications. The aqueous-based coolant used in the present invention typically includes between about 35 weight percent and about 65 weight percent propylene glycol.

2-ethylhexanoic acid, sebacic acid and benzoic acid are all organic acids and as constituents of the aqueous-based coolant, are particularly effective at inhibiting corrosion of aluminum surfaces. 2-ethylhexanoic acid is a monocarboxylic acid having the molecular formula $CH_3(CH_2)_3CH(C_2H_5)CO_2H$. It has a low solubility in water but is soluble in many organic solvents. Sebacic acid is a dicarboxylic acid having the molecular formula $(HOOC)(CH_2)_8(COOH)$. Sebacic acid is a naturally occurring derivative of castor oil and has a low water solubility. Benzoic acid is an aromatic monocarboxylic acid having the molecular formula $C_7H_6O_2$ (or $C_6H_5COOH$). When each of these organic acids is present in an aqueous-based coolant circulating through a cooling system, the organic acid "builds up" on the cooling system surfaces. The organic acids attach to the aluminum (or other metal) surface and form a protective film. Once these organic acids have formed a film on the surface, the film acts as a protective layer preventing corrosion (i.e. electrochemical oxidation) of the surface. The protective film is typically formed gradually over time, not immediately.

Applicants have found that certain combinations of these three organic acids synergistically provide exceptional corrosion inhibition for aluminum surfaces. Through a series of experiments, Applicants found that an approximate 4:1:1 ratio of 2-ethylhexanoic acid:sebacic acid:benzoic acid provides an aqueous-based coolant that takes advantage of the synergistic combination of the organic acids. In exemplary embodiments, the aqueous-based coolant used in the present invention typically includes between about 1.0 weight percent and about 4.0 weight percent 2-ethylhexanoic acid and, more preferably, between about 1.5 weight percent and about 2.5 weight percent 2-ethylhexanoic acid. In exemplary embodiments, the aqueous-based coolant used in the present invention typically includes between about 0.25 weight percent and about 1.0 weight percent sebacic acid and, more preferably, between about 0.35 weight percent and about 0.75 weight percent sebacic acid. In exemplary embodiments, the aqueous-based coolant used in the present invention typically includes between about 0.25 weight percent and about 1.0 weight percent benzoic acid and, more preferably, between about 0.35 weight percent and about 0.75 weight percent benzoic acid. The aqueous-based coolant in one exemplary embodiment contains about 2.0 weight percent 2-ethylhexanoic acid, about 0.5 weight percent sebacic acid and about 0.5 weight percent benzoic acid.

Molybdate oxyanion is a rapidly acting inorganic corrosion inhibitor. The organic acids listed above take time to build up the protective film on the aluminum surfaces. Molybdate oxyanions present in the aqueous-based coolant provide immediate corrosion inhibition while the organic acids are gradually attaching to the aluminum surface and forming the protective film. Molybdate oxyanions also improve the corrosion protection of carboxylate salt fluids; some believe this occurs by aiding in the attachment and formation of the protective film. Molybdate oxyanions can be provided in solution by alkali metal molybdates, alkali earth molybdates, ammonium molybdate and organic molybdate compounds. An exemplary source of molbdate oxyanion is sodium molybdate. Sodium molybdate is a non-oxidizing anodic inhibitor having the molecular formula $Na_2MoO_4$. Sodium molybdate is often found as a dihydrate ($Na_2MoO_4.2H_2O$). In exemplary embodiments, the aqueous-based coolant used in the present invention typically includes between about 0.03 weight percent and about 0.1 weight percent molybdate oxyanion and, more preferably, between about 0.05 weight percent and about 0.075 weight percent molybdate oxyanion. The aqueous-based coolant in one exemplary embodiment contains about 0.06 weight percent sodium molybdate.

The pH of the aqueous-based coolant is adjusted so that optimal solubility of the organic acids and molybdate oxyanions is achieved and their effectiveness is maximized. The pH is typically adjusted after the organic acids and molybdate oxyanions have been introduced into the aqueous-based coolant. In exemplary embodiments, the aqueous-based coolant used in the present invention typically has a pH between 8 and 9 and, more preferably, between about 8.25 and 8.75. The aqueous-based coolant in one exemplary embodiment has a pH between about 8.4 and 8.6. In exemplary embodiments, the pH of the aqueous-based coolant is adjusted with potassium hydroxide. Potassium hydroxide is able to adjust and buffer the pH of the aqueous-based coolant while facilitating a precipitate-free solution. Other buffers such as lithium hydroxide, sodium borate and sodium carbonate/bicarbonate have either been unable to adjust and buffer the pH in the desired range or been shown to cause solubility or precipitation issues.

Due to the high aluminum surface area in some aerospace applications, some commonly used additives can be omitted from the aqueous-based coolant. For example, materials such as copper and carbon steel are not routinely used in spacecraft applications. Therefore, the aqueous-based coolant does not need to contain additives that specifically inhibit corrosion of these materials. The omission of these additives removes their potential unwanted effects from the aqueous-based coolant. For instance, azoles and nitrites have been found to be potentially detrimental to surfaces in simulated spacecraft applications. Azole/organic acid reaction products have been suspected to contribute to the fouling of filters used in cooling systems. Nitrites can reduce to ammonia and shift the pH of the aqueous-based coolant above its effective range in systems having high aluminum surface area. The higher pH can also cause the coolant to react negatively with aluminum surfaces. By omitting these unnecessary additives, their associated potentially unwanted effects are eliminated. In exemplary embodiments, the aqueous-based coolant is substantially free of azoles and nitrites.

In one embodiment of the present invention, a cooling system includes an aluminum or nickel surface and the aqueous-based coolant described above. In exemplary embodiments, the aqueous-based coolant has a pH between 8 and 9 and contains about 35 weight % to about 65 weight % propylene glycol, about 1.0 weight % to about 4.0 weight % 2-ethylhexanoic acid, about 0.25 weight % to about 1.0 weight % sebacic acid, about 0.25 weight % to about 1.0 weight % benzoic acid and about 0.03 weight % to about 0.1 weight % molybdate oxyanion. In an even more exemplary embodiment, the aqueous-based coolant has a pH between 8.25 and 8.75 and contains about 1.5 weight % to about 2.5 weight % 2-ethylhexanoic acid, about 0.35 weight % to about 0.75 weight % sebacic acid, about 0.35 weight % to about 0.75 weight % benzoic acid and about 0.05 weight % to about 0.075 weight % molybdate oxyanion. In a further exemplary embodiment, the aqueous-based coolant has a pH between 8.4 and 8.6 and contains about 2.0 weight % 2-ethylhexanoic acid, about 0.5 weight % sebacic acid, about 0.5 weight % benzoic acid and about 0.06 weight % sodium molybdate. Exemplary embodiments of the cooling system include an aqueous-based coolant that is free of azoles and nitrites.

Figure 2:
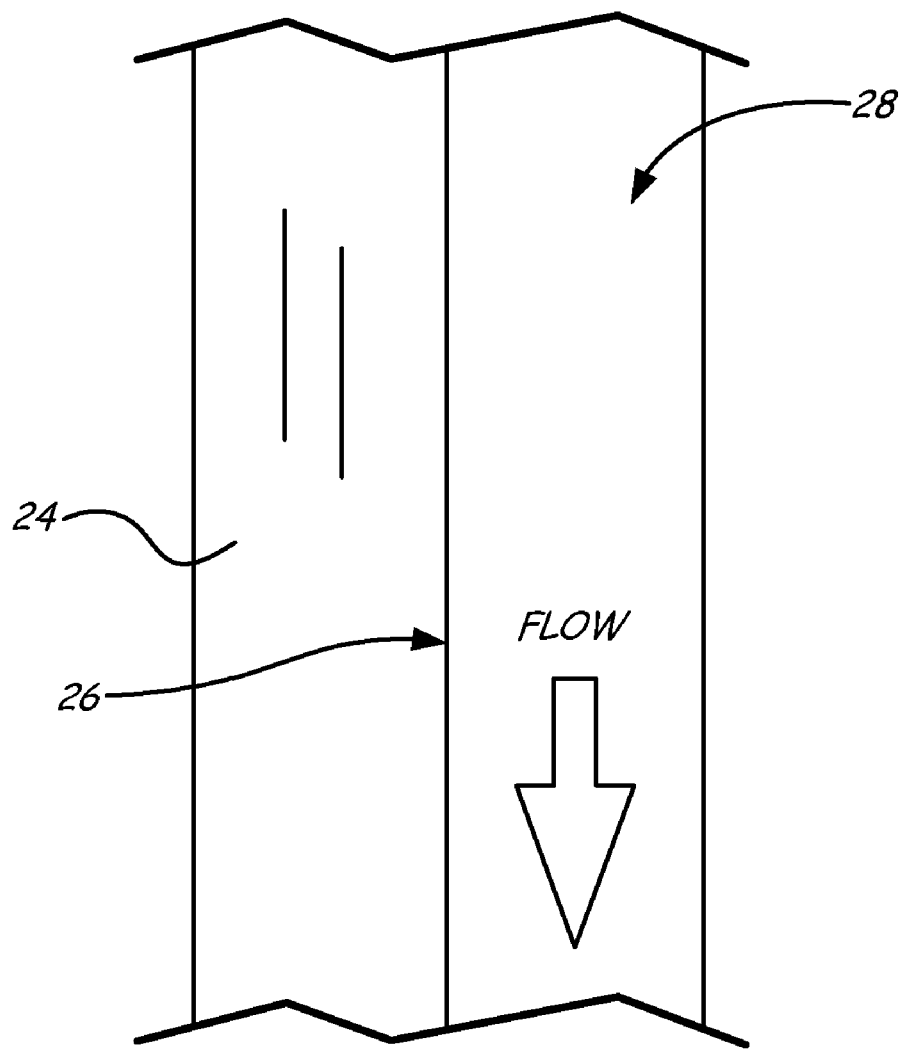
FIG. 2 is a view of a cooling system.

FIG. 1 illustrates a schematic view of one embodiment of a cooling system of the present invention. Heat exchange system 10 includes heat source 12, pump 14, heat exchanger 16, flow control means 18 and fluid reservoir 20. Generally speaking, pump 14 pumps fluid through heat exchange system 10. The flow of fluid through heat exchange system 10 is controlled by pump 14 and flow control means 18. Fluid is added to or removed from heat exchange system 10 via fluid reservoir 20. Heat exchanger 16 is a cooling type heat exchanger for cooling the fluid in heat exchange system 10. Heat exchanger 16 is in fluid communication with coolant loop 22. For the reasons stated above, one or more components of heat exchange system 10 such as pump 14, heat exchanger 16, flow control means 18 or coolant loop 22 contain surfaces having high aluminum and/or nickel surface areas. As a result of the large amounts of aluminum and/or nickel present in components of heat exchange system 10, the component surfaces are subject to corrosion and the aforementioned problems when conventional aqueous-based coolants are used. To cool these component surfaces and prevent unwanted corrosion, heat exchange system 10 contains the aqueous-based coolant described above. FIG. 2 illustrates a magnified view of member 24 having surface 26 cooled by the aqueous-based coolant. Member 24 includes fins, cold plates, valve surfaces, pump surfaces and any other surfaces of heat exchange system 10 that may come into contact with aqueous-based coolant. The aqueous-based coolant is delivered and directed to surface 26 of member 24 via coolant channel 28.

In another embodiment of the present invention, a method of cooling a component surface containing aluminum or nickel includes delivering an aqueous-based coolant to the component surface and cooling the component surface with the aqueous-based coolant. In exemplary embodiments, the aqueous-based coolant is identical to the embodiments described above with respect to the cooling system.

The present invention also provides an aqueous-based coolant for cooling and reducing corrosion potential in applications having high aluminum or nickel surface area to coolant volume ratios. The aqueous-based coolant contains about 1.0 weight % to about 4.0 weight % 2-ethylhexanoic acid, about 0.25 weight % to about 1.0 weight % sebacic acid, about 0.25 weight % to about 1.0 weight % benzoic acid and about 0.03 weight % to about 0.1 weight % molybdate oxyanion.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

The invention claimed is:

1. A cooling system comprising:
    an aluminum or nickel surface; and
    an aqueous-based coolant having a pH between 8 and 9, the aqueous-based coolant comprising:
        about 35 weight % to about 65 weight % propylene glycol;
        about 1.0 weight % to about 4.0 weight % 2-ethylhexanoic acid;
        about 0.25 weight % to about 1.0 weight % sebacic acid;
        about 0.25 weight % to about 1.0 weight % benzoic acid; and
        about 0.03 weight % to about 0.1 weight % molybdate oxyanion.

2. The cooling system of claim 1, wherein the aluminum or nickel surface is a component of an apparatus selected from the group consisting of cold plates, heat exchangers and coolant lines.

3. The cooling system of claim 1, wherein the aqueous-based coolant is substantially free of azoles and nitrites.

4. The cooling system of claim 1, wherein the cooling system contains an aluminum surface and has an aluminum surface area to aqueous-based coolant volume ratio greater than or equal to about $1.0 \text{ cm}^2/\text{mL}$.

5. The cooling system of claim 1, wherein the cooling system contains a nickel surface and has a nickel surface area to aqueous-based coolant volume ratio greater than or equal to about $1.0 \text{ cm}^2/\text{mL}$.

6. The cooling system of claim 1, wherein the aqueous-based coolant contains 2-ethylhexanoic acid, sebacic acid and benzoic acid at a ratio of about 4:1:1.

7. The cooling system of claim 1, wherein the aqueous-based coolant further comprises:
   an amount of potassium hydroxide sufficient for adjusting and buffering the pH of the aqueous-based coolant to a pH between 8.4 and 8.6.

8. The cooling system of claim 1, wherein the aqueous-based coolant has a pH between 8.25 and 8.75 and comprises:
   about 1.5 weight % to about 2.5 weight % 2-ethylhexanoic acid;
   about 0.35 weight % to about 0.75 weight % sebacic acid;
   about 0.35 weight % to about 0.75 weight % benzoic acid; and
   about 0.05 weight % to about 0.075 weight % molybdate oxyanion.

9. The cooling system of claim 8, wherein the aqueous-based coolant has a pH between 8.4 and 8.6 and comprises:
   about 2.0 weight % 2-ethylhexanoic acid;
   about 0.5 weight % sebacic acid;
   about 0.5 weight % benzoic acid; and
   about 0.06 weight % sodium molybdate.

10. A method of cooling a component surface containing aluminum or nickel, the method comprising:
   delivering an aqueous-based coolant having a pH between 8 and 9 to the component surface, the aqueous-based coolant comprising:
      about 35 weight % to about 65 weight % propylene glycol;
      about 1.0 weight % to about 4.0 weight % 2-ethylhexanoic acid;
      about 0.5 weight % to about 1.0 weight % sebacic acid;
      about 0.5 weight % to about 1.0 weight % benzoic acid; and
      about 0.03 weight % to about 0.1 weight % molybdate oxyanion; and
   cooling the component surface with the aqueous-based coolant.

11. The method of claim 10, wherein the component is selected from the group consisting of cold plates, heat exchangers and coolant lines.

12. The method of claim 10, wherein the aqueous-based coolant is substantially free of azoles and nitrites.

13. The method of claim 10, wherein the component surface contains aluminum, and wherein the component surface has an aluminum surface area to aqueous-based coolant volume ratio greater than or equal to about $1.0 \text{ cm}^2/\text{mL}$.

14. The method of claim 10, wherein the component surface contains nickel, and wherein the component surface has a nickel surface area to aqueous-based coolant volume ratio greater than or equal to about $1.0 \text{ cm}^2/\text{mL}$.

15. The method of claim 10, wherein the aqueous-based coolant contains 2-ethylhexanoic acid, sebacic acid and benzoic acid at a ratio of about 4:1:1.

16. The method of claim 10, wherein the aqueous-based coolant has a pH between 8.25 and 8.75 and comprises:
   about 1.5 weight % to about 2.5 weight % 2-ethylhexanoic acid;
   about 0.35 weight % to about 0.75 weight % sebacic acid;
   about 0.35 weight % to about 0.75 weight % benzoic acid; and
   about 0.05 weight % to about 0.075 weight % molybdate oxyanion.

17. The method of claim 16, wherein the aqueous-based coolant has a pH between 8.4 and 8.6 and comprises:
   about 2.0 weight % 2-ethylhexanoic acid;
   about 0.5 weight % sebacic acid;
   about 0.5 weight % benzoic acid; and
   about 0.06 weight % sodium molybdate.

18. An aqueous-based coolant comprising:
   about 35 weight % to about 65 weight % propylene glycol;
   about 1.0 weight % to about 4.0 weight % 2-ethylhexanoic acid;
   about 0.25 weight % to about 1.0 weight % sebacic acid;
   about 0.25 weight % to about 1.0 weight % benzoic acid; and
   about 0.03 weight % to about 0.1 weight % molybdate oxyanion;
   wherein the aqueous-based coolant contains 2-ethylhexanoic acid, sebacic acid and benzoic acid at a ratio of about 4:1:1.

19. The aqueous-based coolant of claim 18 further comprising:
   an amount of potassium hydroxide sufficient for providing the aqueous-based coolant with a pH between 8.4 and 8.6.

20. The aqueous-based coolant of claim 18, wherein the aqueous-based coolant is substantially free of azoles and nitrites.

* * * * *